(12) United States Patent
Tammisetti

(10) Patent No.: US 12,185,424 B2
(45) Date of Patent: Dec. 31, 2024

(54) SECURE ROUTING OF DATA PACKETS INCLUDING WITH USE WITH TRANSPOSITIONAL MODULATION FORTIFIED COMMUNICATIONS

(71) Applicant: TM IP HOLDINGS, LLC, Little Switzerland, NC (US)

(72) Inventor: Mohan Tammisetti, Tucson, AZ (US)

(73) Assignee: TM IP HOLDINGS, LLC, Little Switzerland, NC (US)

( * ) Notice: Subject to any disclaimer, the term of this patent is extended or adjusted under 35 U.S.C. 154(b) by 183 days.

(21) Appl. No.: 18/085,405

(22) Filed: Dec. 20, 2022

(65) Prior Publication Data

US 2024/0121595 A1    Apr. 11, 2024

Related U.S. Application Data

(63) Continuation-in-part of application No. 17/751,470, filed on May 23, 2022, now abandoned, which is a
(Continued)

(51) Int. Cl.
*H04L 27/00*     (2006.01)
*G01S 7/00*      (2006.01)
(Continued)

(52) U.S. Cl.
CPC .......... *H04W 8/22* (2013.01); *G01S 7/003* (2013.01); *G01S 13/765* (2013.01); *H04W 8/005* (2013.01); *H04L 27/0012* (2013.01)

(58) Field of Classification Search
CPC ......... H04W 8/22; H04W 8/005; G01S 7/003; G01S 13/765; H04L 27/0012
(Continued)

(56) References Cited

U.S. PATENT DOCUMENTS 3,968,486 A     7/1976  Gerdes
4,259,888 A     4/1981  Gross
(Continued)

FOREIGN PATENT DOCUMENTS

TW    201742414        12/2017
WO    WO2014145868      9/2014
WO    WO2017184743      10/2017

OTHER PUBLICATIONS

EP Search Report in European Application No. 17786562.3, dated Apr. 1, 2019, 11 pages.
(Continued)

*Primary Examiner* — Zewdu A Kassa
(74) *Attorney, Agent, or Firm* — HAYES SOLOWAY P.C.

(57) ABSTRACT

A method and system for secure routing of data packets includes a data stream on a first communication network formed from a plurality of data packets. A source security certificate engine is implemented on a first computerized device. The source security certificate engine: assigns a certificate signature to a data packet of the data stream on a per-packet level; assigns a network route number to the data packet of the data stream to thereby encrypt the data packet; generates at least one encryption key; and selects a carrier network path from available carrier channels, wherein the encrypted data packet is communicated over the selected carrier network path. A destination security certificate engine implemented on a second computerized device, decrypts the encrypted data packet using the at least one encryption key. The data packet may be carried in a transpositional modulation (TM) signal communicated on a TM channel.

20 Claims, 8 Drawing Sheets

Related U.S. Application Data continuation-in-part of application No. 16/436,381, filed on Jun. 10, 2019, now Pat. No. 11,343,670, which is a continuation of application No. 15/880,753, filed on Jan. 26, 2018, now Pat. No. 10,321,304, which is a continuation of application No. 15/655,380, filed on Jul. 20, 2017, now Pat. No. 9,883,375, which is a continuation of application No. 15/367,482, filed on Dec. 2, 2016, now Pat. No. 9,716,997, which is a continuation of application No. 15/133,589, filed on Apr. 20, 2016, now Pat. No. 9,516,490.

(60) Provisional application No. 63/323,018, filed on Mar. 23, 2022.

(51) Int. Cl.
*G01S 13/76* (2006.01)
*H04W 8/00* (2009.01)
*H04W 8/22* (2009.01)

(58) Field of Classification Search
USPC ............ 375/259, 260, 261, 219, 295, 316
See application file for complete search history.

(56) References Cited

U.S. PATENT DOCUMENTS

| | | |
|---|---|---|
| 4,301,415 A | 11/1981 | McFayden |
| 4,318,055 A | 3/1982 | Hopwood et al. |
| 4,342,245 A | 8/1982 | Gross |
| 4,584,534 A | 4/1986 | Lijphart et al. |
| 4,613,974 A | 9/1986 | Vokac et al. |
| 4,680,633 A | 7/1987 | Gerdes et al. |
| 4,803,705 A | 2/1989 | Gillingham et al. |
| 4,989,219 A | 1/1991 | Gerdes et al. |
| 5,021,786 A | 6/1991 | Gerdes |
| 5,124,706 A | 6/1992 | Gerdes |
| 5,155,672 A | 10/1992 | Brown |
| 5,165,017 A | 11/1992 | Eddington et al. |
| 5,184,218 A | 2/1993 | Gerdes |
| 5,200,715 A | 4/1993 | Gerdes et al. |
| 5,200,822 A | 4/1993 | Bronfin et al. |
| 5,327,237 A | 7/1994 | Gerdes et al. |
| 5,511,100 A | 4/1996 | Lundberg et al. |
| 5,557,333 A | 9/1996 | Jungo et al. |
| 6,522,697 B1 | 2/2003 | Spickermann |
| 6,559,757 B1 | 5/2003 | Deller et al. |
| 6,788,154 B2 | 9/2004 | Maneatis |
| 7,813,433 B2 | 10/2010 | Moffatt |
| 7,856,050 B1 | 12/2010 | Wiss et al. |
| 8,537,952 B1 | 9/2013 | Arora |
| 9,014,293 B2 | 4/2015 | Gerdes |
| 9,194,946 B1 | 11/2015 | Vacanti |
| 9,516,490 B1 | 12/2016 | Gerdes et al. |
| 9,716,997 B1 | 7/2017 | Gerdes et al. |
| 9,883,375 B2 | 1/2018 | Gerdes et al. |
| 2003/0074684 A1 | 4/2003 | Noon |
| 2004/0247041 A1 | 12/2004 | Biedka et al. |
| 2004/0252531 A1 | 12/2004 | Cheng et al. |
| 2005/0030160 A1 | 2/2005 | Goren |
| 2005/0065901 A1 | 3/2005 | Diong |
| 2005/0114663 A1 | 5/2005 | Cornell et al. |
| 2005/0200391 A1 | 9/2005 | Steinbach et al. |
| 2006/0006914 A1 | 1/2006 | Fan-Jiang |
| 2006/0197564 A1 | 9/2006 | Yen |
| 2007/0084920 A1 | 4/2007 | Slatter et al. |
| 2007/0277035 A1 | 11/2007 | Patel et al. |
| 2008/0041485 A1 | 2/2008 | Anagnostopoulos |
| 2009/0007246 A1 | 1/2009 | Gutowski et al. |
| 2009/0088077 A1 | 4/2009 | Brown et al. |
| 2010/0111225 A1 | 5/2010 | Kroeger |
| 2010/0203854 A1 | 8/2010 | Yu et al. |
| 2011/0043039 A1 | 2/2011 | Mancebo de Castillo Pagola |
| 2012/0155344 A1 | 6/2012 | Wiley et al. |
| 2012/0171963 A1 | 7/2012 | Tsfaty |
| 2013/0010955 A1 | 1/2013 | Lu et al. |
| 2013/0244594 A1 | 9/2013 | Alrabadi et al. |
| 2015/0023456 A1 | 1/2015 | Vann et al. |
| 2015/0092621 A1 | 4/2015 | Jalloul et al. |
| 2015/0237460 A1 | 8/2015 | Goyal et al. |
| 2016/0013831 A1 | 1/2016 | Lea et al. |
| 2017/0093811 A1 | 3/2017 | Dolev et al. |
| 2017/0251062 A1* | 8/2017 | Lu .................... H04L 63/166 |
| 2017/0325085 A1 | 11/2017 | Gerdes et al. |
| 2017/0373403 A1 | 12/2017 | Watson |
| 2018/0124048 A1 | 5/2018 | Yoo |
| 2018/0152833 A1 | 5/2018 | Gerdes et al. |
| 2018/0176134 A1 | 6/2018 | Liu et al. |
| 2019/0372822 A1 | 12/2019 | Woodsum |
| 2021/0350197 A1 | 11/2021 | Chow |

OTHER PUBLICATIONS

International Search Report and Written Opinion for International Application No. PCT/US 2017/028381, mailed Aug. 17, 2017, 7 pages.

International Search Report and Written Opinion for International Application No. PCT/US2024/011676, mailed May 16, 2024, 9 pages.

International Search Report and Written Opinion for International Application No. PCT/US2024/014316, mailed May 13, 2024, 13 pages.

International Search Report and Written Opinion for International Application No. PCT/US2023/085262, mailed May 9, 2024, 17 pages.

International Search and Written Opinion for International Application No. PCT/US2024/014316, mailed May 13, 2024, 13 pages.

International Search and Written Opinion for International Application No. PCT/US2024/23903, mailed Aug. 5, 2024, 10 pages.

Alwan H, Agarwal A. A Multipath Routing Approach for Secure and Reliable Data Delivery in Wireless Sensor Networks. International Journal of Distributed Sensor Networks. 2013;9(3). doi:10.1155/2013/232798.

U.S. Appl. No. 16/436,381, filed Jun. 10, 2019.
U.S. Appl. No. 15/880,753, filed Jan. 26, 2018.
U.S. Appl. No. 15/655,380, filed Jul. 20, 2017.
U.S. Appl. No. 15/367,482, filed Dec. 2, 2016.
U.S. Appl. No. 15/133,589, filed Apr. 20, 2016.

* cited by examiner

SECURE ROUTING OF DATA PACKETS INCLUDING WITH USE WITH TRANSPOSITIONAL MODULATION FORTIFIED COMMUNICATIONS

CROSS REFERENCE TO RELATED APPLICATION

This application is a continuation-in-part application of U.S. patent application Ser. No. 17/751,470, filed May 23, 2022, which claims priority to U.S. provisional patent application Ser. No. prov. 63/323,018 and is a continuation-in-part application of U.S. patent application Ser. No. 16/436,381 filed on Jun. 10, 2019, which is a continuation application of U.S. patent application Ser. No. 15/880,753, filed on Jan. 26, 2018, now U.S. Pat. No. 10,321,304, which is a continuation application of U.S. patent application Ser. No. 15/655,380, filed on Jul. 20, 2017, now U.S. Pat. No. 9,883,375, which is a continuation application of U.S. patent application Ser. No. 15/367,482, filed on Dec. 2, 2016, now U.S. Pat. No. 9,716,997, which is a continuation of U.S. patent application Ser. No. 15/133,589, filed on Apr. 20, 2016, now U.S. Pat. No. 9,516,490, which are hereby incorporated by reference in their entirety.

FIELD OF THE DISCLOSURE

The present disclosure is generally related to RF signal transmission and more particularly is related to secure routing of data packets including with use with transpositional modulation fortified communications.

BACKGROUND OF THE DISCLOSURE

Radio frequency (RF) sinusoidal waveforms are transmitted from one location to another to convey data. When an RF wireless waveform is transmitted, it often goes through transformations within different aspects of the transmitter, receiver, and/or transceiver, as the case may be. For example, noise, often referred to as white Gaussian noise, is added to the transmitted signal, and when received, the receiver will receive both the original signal and the noise together. For digital communications, various components are used to transmit the original signal and receive the original signal with noise added, and then separate the noise from the original signal to obtain the underlying data of the original signal.

It is common to use modulation techniques with RF signals, where information is added to the original signal. For instance, carrier modulation techniques are used to transmit information signals from one location to another. Traditional signal modulation techniques include, for example, amplitude modulation (AM), frequency modulation (FM), phase modulation (PM). In addition, complex modulation techniques exist that incorporate aspects of AM, FM, and PM such as quadrature phase shift keying (QPSK), amplitude phase shift keying (APSK) and including quadrature amplitude modulation (QAM). While these modulation techniques exist, they fall short of meeting the current and future needs of wireless signal transmission.

Additionally, the communication of data in a secured manner which is not susceptible to eavesdropping or other foreign interference remains a high priority in the digital age. While many data encryption techniques exist, the evolution of technology can sometimes result in new techniques to break the encryption of data to access the underlying data. Thus, there is the need for heightened security and encryption techniques which utilize cutting-edge technology which are not susceptible to unauthorized access.

Thus, a heretofore unaddressed need exists in the industry to address the aforementioned deficiencies and inadequacies.

SUMMARY OF THE DISCLOSURE

Embodiments of the present disclosure provide a system for secure routing of data packets. Briefly described, in architecture, one embodiment of the system, among others, can be implemented as follows. A data stream is on a first communication network, the data stream formed, at least in part, from a plurality of data packets. A source security certificate engine is implemented on a first computerized device, the first computerized device in communication with the first communication network, wherein the source security certificate engine: assigns a certificate signature to a data packet of the data stream on a per-packet level; assigns a network route number to the data packet of the data stream to thereby encrypt the data packet; generates at least one encryption key; and selects a carrier network path from available carrier channels, wherein the encrypted data packet is communicated over the selected carrier network path. A destination security certificate engine is implemented on a second computerized device, the second computerized device in communication with the selected carrier network path and a second communication network, wherein the destination security certificate engine decrypts the encrypted data packet using the at least one encryption key.

In one aspect of the system, the source security certificate engine further comprises: a packet authenticator that authenticates the data packet; a certificate manager that assigns the certificate signature to the data packet; and a learned route protocol utilizing artificial intelligence processing techniques to select the selected carrier network path.

In this aspect of the system, the learned route protocol selects the selected carrier network path based on a selected security level for the data packet.

In this aspect of the system, the selected carrier network path is selected based on the selected security level for the data packet, wherein the selected security level for the data packet influences a randomness level of the selected carrier network path and channel conditions of the available carrier channels.

In this aspect of the system, a randomness level of the selected carrier network path is based on at least one of: data confidentiality of the data packet, source authentication of the data packet, source destination random code of the data packet.

The present disclosure can also be viewed as providing methods for secure routing of data packets. In this regard, one embodiment of such a method, among others, can be broadly summarized by the following steps: providing a data stream on a first communication network, the data stream formed, at least in part, from a plurality of data packets; using a source security certificate engine implemented on a first computerized device, the first computerized device in communication with the first communication network: assigning a certificate signature to a data packet of the data stream on a per-packet level; assigning a network route number to the data packet of the data stream to thereby encrypt the data packet; generating at least one encryption key; and selecting a carrier network path from available carrier channels, wherein the encrypted data packet is communicated over the selected carrier network path; and decrypting the encrypted data packet using the at least one encryption key on a destination security certificate engine implemented on a second computerized device, the second computerized device in communication with the selected carrier network path and a second communication network.

In one aspect of the method, the source security certificate engine further comprises: a packet authenticator that authenticates the data packet; a certificate manager that assigns the certificate signature to the data packet; and a learned route protocol utilizing artificial intelligence processing techniques to select the selected carrier network path.

In this aspect of the method, the method further comprises selecting, by the learned route protocol, the selected carrier network path based on a selected security level for the data packet.

In this aspect of the method, the selected carrier network path is selected based on the selected security level for the data packet, wherein the selected security level for the data packet influences a randomness level of the selected carrier network path and channel conditions of the available carrier channels.

In this aspect of the method, a randomness level of the selected carrier network path is based on at least one of: data confidentiality of the data packet, source authentication of the data packet, source destination random code of the data packet.

Embodiments of the present disclosure provide a system for secure routing of data packets. Briefly described, in architecture, one embodiment of the system, among others, can be implemented as follows. A data stream is on a first communication network, the data stream formed, at least in part, from a plurality of data packets. A source security certificate engine is implemented on a first computerized device, the first computerized device in communication with the first communication network, wherein the source security certificate engine: assigns a certificate signature to a data packet of the data stream on a per-packet level; assigns a network route number to the data packet of the data stream to thereby encrypt the data packet; generates at least one encryption key; and selects a carrier network path, wherein the encrypted data packet is communicated over the selected carrier network path. A plurality of carrier channels are provided, wherein the selected carrier network path is selected from the plurality of carrier channels, and wherein at least one of the plurality of carrier channels is a transpositional modulation (TM) channel. A TM signal is communicated on the TM channel, wherein the TM channel with TM signal does not exceed a spectral mask of an original carrier of an RF channel, and wherein the encrypted data packet is carried within the TM signal. A destination security certificate engine is implemented on a second computerized device, the second computerized device in communication with the selected carrier network path and a second communication network, wherein the destination security certificate engine receives the TM signal and decrypts the encrypted data packet using the at least one encryption key.

In one aspect of the system, the source security certificate engine further comprises: a packet authenticator that authenticates the data packet; a TM certificate manager that assigns the certificate signature to the data packet; and a learned route protocol utilizing artificial intelligence processing techniques to select the selected carrier network path.

In this aspect of the system, the learned route protocol selects the selected carrier network path based on a selected security level for the data packet.

In this aspect of the system, the selected carrier network path is selected based on the selected security level for the data packet, wherein the selected security level for the data packet influences a randomness level of the selected carrier network path and channel conditions of the available carrier channels.

In this aspect of the system, a randomness level of the selected carrier network path is based on at least one of: data confidentiality of the data packet, source authentication of the data packet, source destination random code of the data packet.

The present disclosure can also be viewed as providing methods for secure routing of data packets. In this regard, one embodiment of such a method, among others, can be broadly summarized by the following steps: providing a data stream on a first communication network, the data stream formed, at least in part, from a plurality of data packets; using a source security certificate engine implemented on a first computerized device, the first computerized device in communication with the first communication network: assigning a certificate signature to a data packet of the data stream on a per-packet level; assigning a network route number to the data packet of the data stream to thereby encrypt the data packet; generating at least one encryption key; and selecting a carrier network path, wherein the encrypted data packet is communicated over the selected carrier network path; providing a plurality of carrier channels, wherein the selected carrier network path is selected from the plurality of carrier channels, and wherein at least one of the plurality of carrier channels is a transpositional modulation (TM) channel; communicating a TM signal on the TM channel, wherein the TM channel with TM signal does not exceed a spectral mask of an original carrier of an RF channel, and wherein the encrypted data packet is carried within the TM signal; and receiving the TM signal at a destination security certificate engine implemented on a second computerized device, the second computerized device in communication with the selected carrier network path and a second communication network, and decrypting the encrypted data packet at the destination security certification engine using the at least one encryption key.

In one aspect of the method, the source security certificate engine further comprises: a packet authenticator that authenticates the data packet; a TM certificate manager that assigns the certificate signature to the data packet; and a learned route protocol utilizing artificial intelligence processing techniques to select the selected carrier network path.

In this aspect of the method, the method further comprises selecting, by the learned route protocol, the selected carrier network path based on a selected security level for the data packet.

In this aspect of the method, the selected carrier network path is selected based on the selected security level for the data packet, wherein the selected security level for the data packet influences a randomness level of the selected carrier network path and channel conditions of the available carrier channels.

In this aspect of the method, a randomness level of the selected carrier network path is based on at least one of: data confidentiality of the data packet, source authentication of the data packet, source destination random code of the data packet.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

To improve over conventional data communication and transmission, the subject disclosure is directed to systems and methods of secure routing of data packets, which can be used with transpositional modulation fortified communication techniques. Conventional secure data transmission occurs on the data stream level, where the entirety of the data stream are encrypted, transmitted, and then decrypted. For instance, a continuous data stream or a data file may be encrypted as a whole before transmission such that a security certificate applies to the whole data stream or whole data file. While this encryption can be successful, the encryption of the full data stream or a full data file results in significant bandwidth usage, which limits the speed, convenience, and efficiency of data transmission.

To improve over this shortcoming in the art, the subject system and methods are directed to encryption on a data packet level, where data is encrypted at each data packet ("per-packet") individually within a data stream. Encryption on the per-packet level allows for enhanced security of the overall data stream, enhanced communication of each of the data packets, and a more efficient transmission of the data due to a decreased use in bandwidth. In particular, while this novel per-packet data encryption can be applied to various communication protocols, it may be used advantageously with transpositional modulation (TM) fortified communications.

Figure 1:
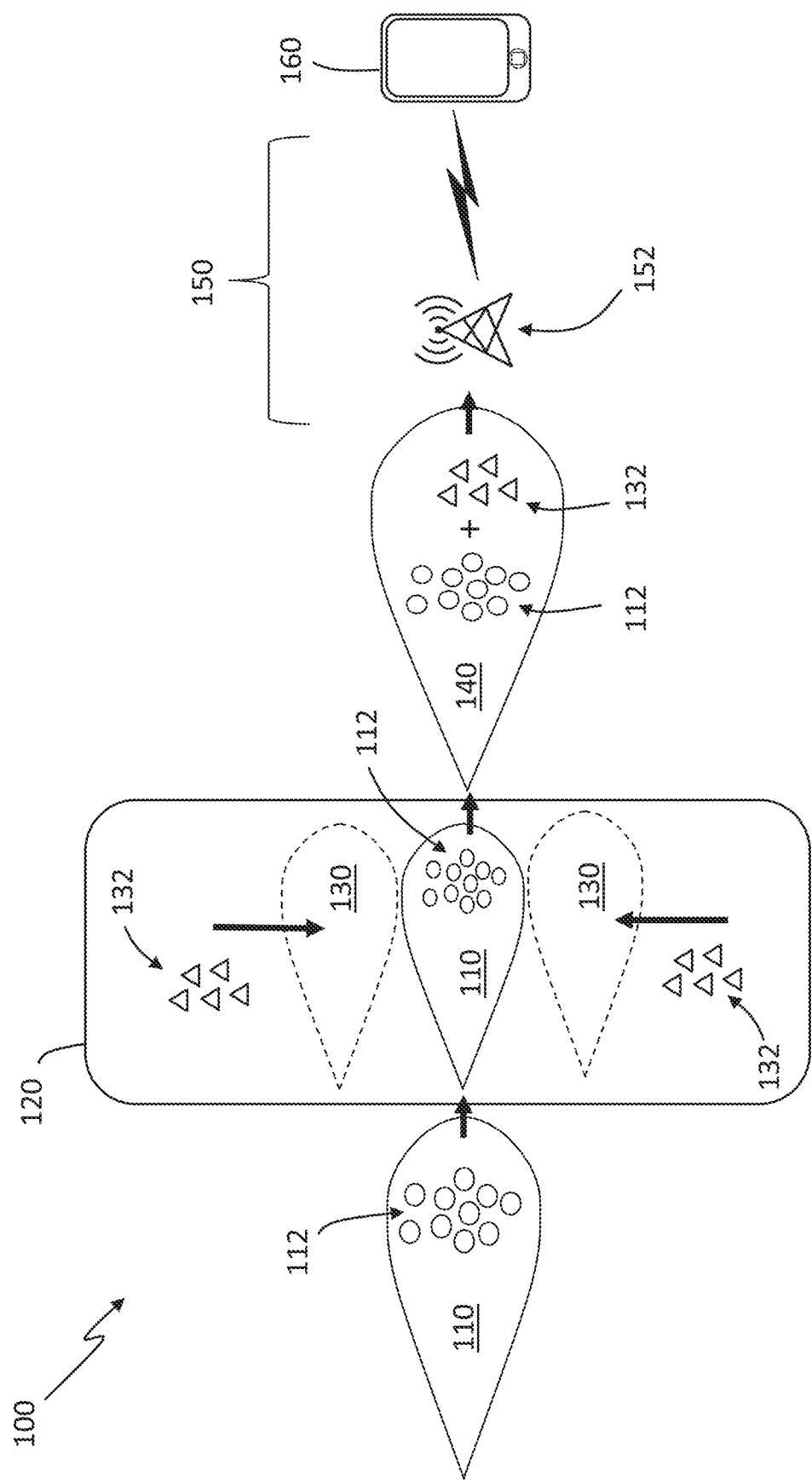
FIG. 1 is a diagrammatical illustration of a system for transpositional modulation fortified communication, in accordance with embodiments of the present disclosure.
Figure 2:
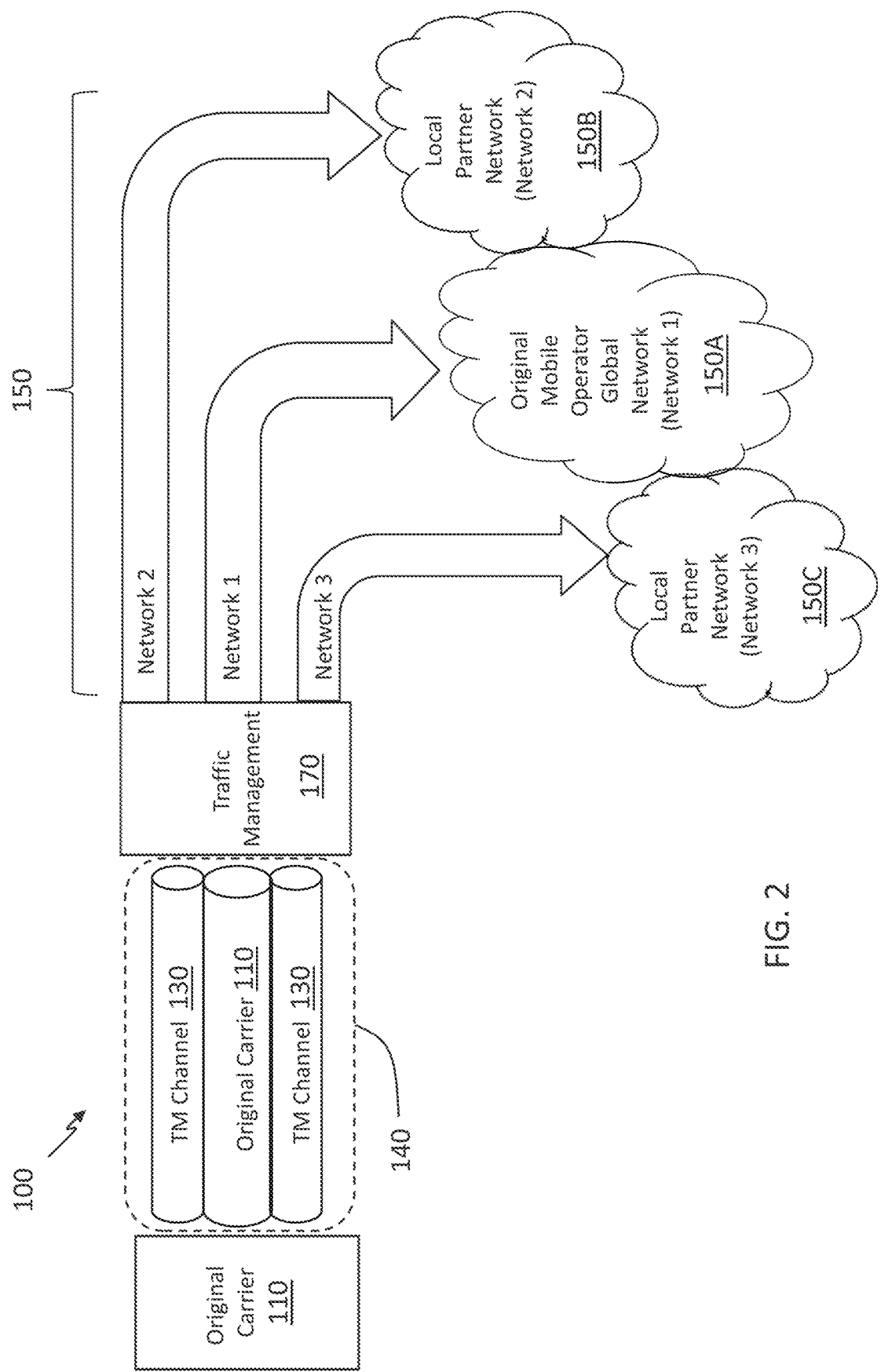
FIG. 2 is a diagrammatical illustration of the system for transpositional modulation fortified communication of FIG. 1 with a traffic management module, in accordance with embodiments of the present disclosure.

As background information about TM communications, FIGS. 1-2 illustrate systems of using TM fortified communication which can be used to increase the effective or usable bandwidth in a spectral mask, provide obfuscation of signal data, and other benefits to wireless communications.

FIG. 1 is a diagrammatical illustration of a system for transpositional modulation fortified communication 100, in accordance with embodiments of the present disclosure. The system for transpositional modulation fortified communication 100, which may be referred to herein simply as 'system 100' includes an original carrier 110 of an RF channel operating within a spectral mask 120. The original carrier 110 of the RF wireless channel has a carrier signal with a first quantity of data 112. The first quantity of data 112 may include any type of data, for instance, textual, visual, pictographic, videographic, encrypted, or other types of data which may be transmitted between electronic devices, such as computers, servers, cellular phones, or other computing devices. The original carrier 110 may move through a network system through various devices, processes, or iterations. For example, in digital communication, the information source may be transmitted on a channel, where various encoders, digital modulators, digital demodulators, receivers, channel decoders and receivers, and/or source decoders and receivers are used to process and transmit the signal.

The original carrier 110 operates within the spectral mask 120, within the spectrum, e.g., parameter or boundary of levels, of RF transmission for a particular communication protocol which is often defined by an organization such as the FCC, the ITU, or the ETSI, or another organization. The spectral mask 120 may be defined by different frequencies for various types of signals or communication protocols. For example, 4G communication networks commonly operate within 700 MHz-2500 MHz while 5G ultra-wideband may operate at frequencies of approximately 28 GHz and 39 GHz.

While the original carrier 110 is moving through the transmission process, at least one transpositional modulation (TM) channel 130 is added to the original carrier 110, thereby generating a TM fortified carrier 140 with signal. As shown in FIG. 1, the TM channel 130, or TM mods, includes a second quantity of data 132. When the TM channel 130 is added to the original carrier 110 to form the TM fortified carrier 140, the first quantity of data 112 of the original carrier 110 and the second quantity of data 132 of the TM channel 130 are both included in the TM fortified carrier 140. The first and second quantities of data 112, 132 may remain separate within the TM fortified carrier 140, or be combined in whole or part. When the at least one TM channel 130 and the original carrier 110 are formed into the TM fortified carrier 140, the combined signal and data remains under the spectral mask 120, such that the collective signals and data do not exceed the spectral mask 120.

It is noted that any number of TM channels 130 may be added to the original carrier 110, so long as the cumulative signal of the added TM channels 130 with the original carrier 110 remains within the spectral mask 120. For instance, the TM signal may be demodulated to be orthogonal to a matched filter used for a waveform of the signal of the original carrier 110. In FIG. 1, two TM channels 130 are depicted being added to the original carrier 110. It is possible to only include one TM channel, or to include a plurality of TM channels 130, as may be dependent on the system and its intended use. The TM channel or channels 130 added may utilize sidebands or lobes within the original waveform of the spectral mask 120, such that they remain within the spectral mask 120. This allows the sidebands of the original waveform to be used for communication purposes beyond that traditionally used with the original carrier 110, which increases the usable bandwidth within the spectral mask 120. As such, it is possible to transmit a larger quantity of data within the spectral mask 120 using the TM channels 130 in comparison to conventional techniques using only an original carrier 110 or using non-TM modulation.

The fortified TM carrier 140 may then be sent through the network 150 to an end destination. For instance, the network 150 may include various antennas 152 which are used to transmit fortified TM carrier 140 signals. Other network devices may also be used. One or more electronic or computerized devices 160, such as computers, smart phones, or similar electronics may be connected to the network 150 and receive the fortified TM carrier 140, where all or part of the data within the fortified TM carrier 140 can be decoded and received. One benefit of the system 100 is the superior quality of experience that the user of the electronic device 160 achieves, in data transmission speed, increased bandwidth, and increased security and/or privacy.

With regards to increased data transmission speed and bandwidth, the utilization of the TM channel 130 on the sidebands of the spectral mask 120 allows for the ability to include a larger quantity of data than using only the original carrier 110, since additional data can be transmitted within the TM channels 130 without detracting from the bandwidth of the original carrier 110. This effectively increases the overall bandwidth that is usable within the spectrum. In turn, this can be used to transmit more data at a given time than has been conventionally used within a given spectral mask 120, thereby providing increased transmission speeds. In mobile networks, such as with 5G bandwidths using less spectrum, the system 100 can provide a multifold increase in bandwidth out of an existing mobile network operator's spectrum. For instance, in some situations, the system 100 can effectively double the bandwidth in an existing network.

While a conventional receiver of the electronic device 160 may be capable of receiving the first quantity of data 112 of the original carrier 110, it is not capable of receiving the second quantity of data 132 of the TM channel 130. This is because conventional (non-TM) receivers are not capable of deciphering the data within the TM channel 130, since these conventional receivers identify this data as noise, and thus ignore this data. Accordingly, it is possible to utilize this characteristic of conventional receivers to effectively secure or obfuscate the second quantity of data 132 within the TM channel 130 from devices 160 which only utilize conventional, non-TM receivers.

However, when the device 160 includes a TM-receiver, e.g., a receiver capable of receiving and identifying data transmitted within a TM channel 130, it is possible for the device 160 to successfully recognize the second quantity of data 132 within the TM channel 130 and thus receive it. In other words, a TM-receiver is capable of identifying that the second quantity of data 132 which is transmitted within the TM channel 130 is not noise, where the TM-receiver decodes the second quantity of data 132 instead of ignoring it. In this way, it is possible to use the TM channel 130 for the transmission of data which requires heightened security, privacy, or otherwise is desired to be kept from being received by a device 160 with only a conventional receiver. For example, it may be possible to send null signals within the first quantity of data 112 of the original carrier 110, while important or sensitive data is sent within the second quantity of data 132 of the TM channel 130.

While TM offers improvements over conventional signal transmission, there is a need to manage network traffic with TM signals to ensure there is efficient and uninterrupted service. For instance, for TM signals communicated through multiple different networks, there is often a need to steer, switch, or split the signal to, from, or between different access network points. These network points may be within various network communication protocols and systems, such as 5G, 4G, WiFi, satellite, or others. Managing the network traffic throughout the TM communication system may help ensure that the mode of access for transmitting the TM signal is selected and that there is seamless handover between different networks.

To address traffic management with TM signals, various traffic management systems and methods may be employed. For instance, FIG. 2 is a diagrammatical illustration of the system for transpositional modulation fortified communication of FIG. 1 with a traffic management module, in accordance with embodiments of the present disclosure. Referring to FIG. 2, the original carrier 110 is provided with one or more TM channels 130 to form the TM fortified carrier 140, as previously described in FIG. 1. The TM fortified carrier 140 may be processed through a traffic management module 170, which, in one example, may operate similar to a traditional ATSSS technique, in that, it may utilize a rules engine to modify, direct, or otherwise alter the signal or signals of the TM fortified carrier 140. In particular, the traffic management module 170 may direct the TM fortified carrier 140 through the network 150 and to a user device 160 (FIG. 1).

As is known in the field, the 3rd Generation Partnership Project (3GPP) release 16 (Rel 16) introduced ATSSS (Access traffic steering, switching, and splitting) which allows user traffic steering across multiple access technologies such as 5G, 4G, WiFi, Wireless, Satellite etc., at a finer granularities than a PDU session, which has been used to provide connectivity between applications on user equipment (UE) and a data network (DN) such as the Into et or private networks. ATSSS introduces a multi-access PDU session, a PDU session for which the data traffic can be served over one or more concurrent accesses such as trusted 3GPP and non-3GPP access, and untrusted non-3GPP access.

In the system 100, the network 150 may be separated into a plurality of subnetworks, such as a first network 150A, a second network 150B, and a third network 150C, which are representative of three data paths. It is noted that any number of subnetworks may be included within the system 100, including fewer or greater than the three subnetworks depicted in FIG. 2, so long as all subnetworks are within the spectrum. Each of the subnetworks 150A-150C may operate as a data path through which data within the TM fortified carrier 140 can be transmitted.

3GPP provides for network splitting within the main waveform, but this requires additional network IDs and effectively remains a single network within the original carrier. The system 100, in contrast, can add additional networks through the use of TM, which increases the usable space within the spectrum, such that additional networks with optionally different parameters can be utilized. It is further noted that each of the subnetworks 150A-150C may be separated into further subnetworks. For instance, each of the subnetworks 150A-150C may become three 5G networks, when traditional ATSSS is overlaid on the system 100.

The system 100 may utilize the subnetworks 150A-150C to transmit different parts of the TM fortified carrier 140 signal in different subnetworks 150A-150C, thereby allowing for selective control of the network path for a particular type of signal data. For instance, as discussed relative to FIG. 1, with multiple data paths, where the first and second quantities of data 112, 132 are transmittable along different paths from one another, such that the original carrier signal data can be transmitted along a different subnetwork from that of the data within the TM channel 130.

It can be beneficial for the subnetworks 150A-150C to have different parameters which are configured to provide different data transmission benefits. For instance, network 1 150A can offer faster data transmission speeds, while network 2 150B can offer different privacy protocols, while network 3 150C can provide different security protocols. A user or wireless operator can then use these different parameters of the subnetworks 150A-150C to provide adjustable or tailored use based on a desired type of enhancement. For example, a user who desires faster transmission speeds but does not need increased security or privacy can be directed to network 1 150A, while a user who desired heightened privacy can be directed to network 3 150C. The subnetworks 150A-150C can effectively be used to provide dynamic wireless communications to users based on the user's own preference.

As an example, a global network, such as AT&T® or Verizon®, can utilize this network splitting by providing one main network (network 1) for standard wireless communication, but then offer certain customers improved data transmission through other subnetworks (network 2 or network 3). For instance, network 2 or network 3 could be used for local networks, while network 1 is a global network, or network 2 and network 3 could be used for secure communications utilized by commercial or governmental customers where enhanced security is provided, such as through the aforementioned obfuscation techniques. This system 100 can be used to generate increased revenue for network operators by providing enhanced data transmission networks to customers willing to pay more for these services. These so-called 'local edge' communications can be avenues for new revenue generation by enabling localized data communications on the mobile edge of the spectrum.

Figure 3:
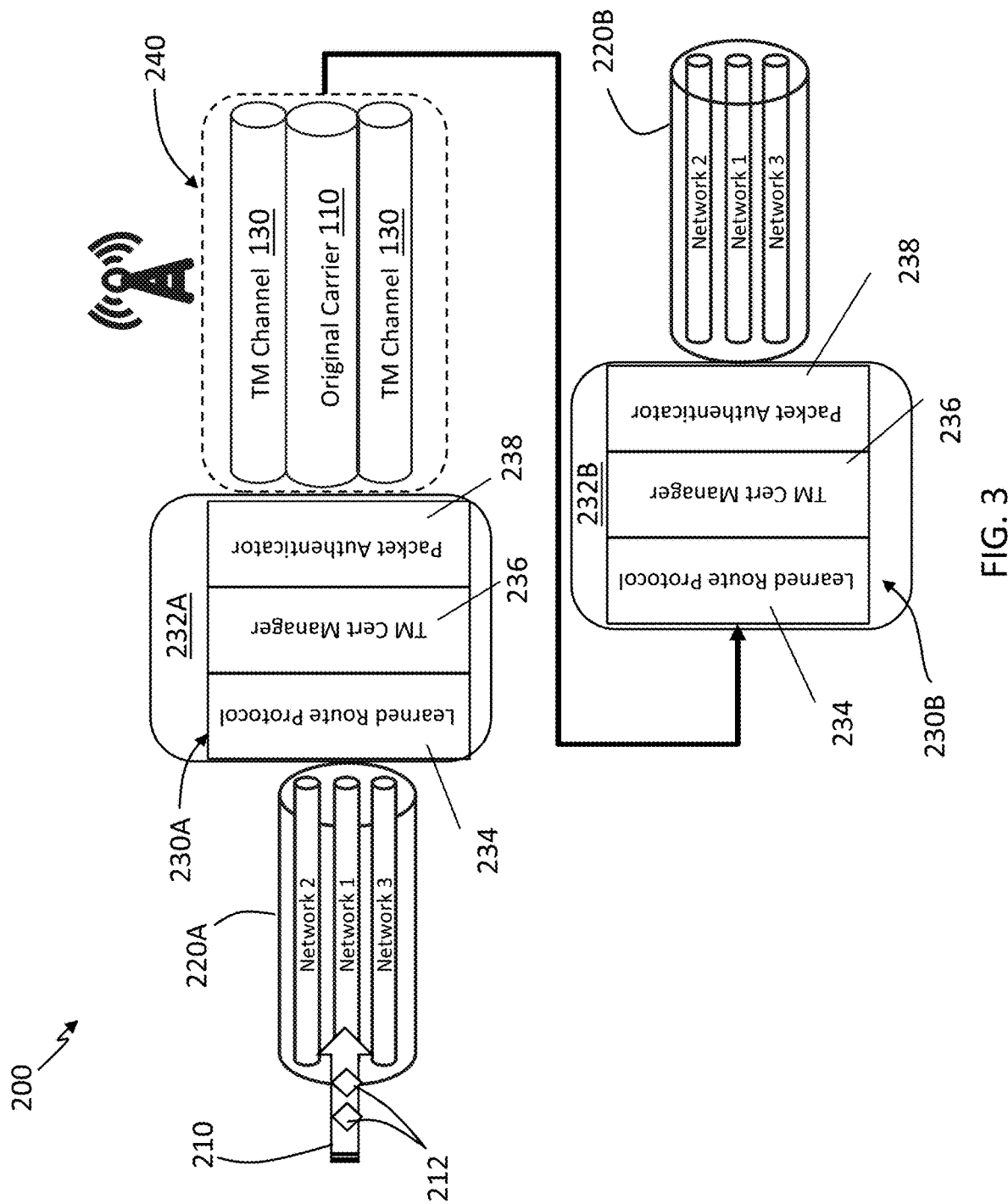
FIG. 3 is a diagrammatical illustration of a system for secure routing of data packets which uses transpositional modulation fortified communication, in accordance with embodiments of the present disclosure.

With the background of TM communications per FIGS. 1-2, FIG. 3 is a diagrammatical illustration of a system for secure routing of data packets 200 which uses transpositional modulation fortified communication, in accordance with embodiments of the present disclosure. The system for secure routing of data packets 200, which may be referred to herein as 'system 200' includes a data stream 210 provided, communicated, or transmitted on a first communication network 220A. The data stream 210 may be originated at any switch, router, or computing platform that originates data packets 212 within the data stream 210. In the Example depicted in FIG. 3, TM communication techniques are employed, and Network 1 may be the original network, whereas network 2 and network 3 may be added by TM carriers. In this example, different TM modifications of the carrier can be used to create TM carriers which can route data, as described relative to FIGS. 1-2.

The first communication network 220A may include various networks, in terms of type and number, including, for example, wired or wireless networks, Personal Area Networks (PAN), Local Area Networks (LAN), Wide Area Networks (WAN), Wireless Local Area Networks (WLAN), the Internet, a cloud network, or any other type of network. The data stream 210 may include any type of electronic or computerized data, such as a data file or a portion thereof, of any type, medium, or file structure.

The data stream 210 is formed, at least in part, from a plurality of data packets 212 which is a formatted unit of data capable of being carried by a packet-switched network, where the data packet 212 commonly includes control information, such as a header and trailer, and user data, which is commonly referred to as the payload. The control information may provide data for delivering the payload, such as, for instance, the source and destination network addresses, error detection codes, or sequencing information, the Emergency Broadcast, Tactical Obfuscated Communications, or others.

The data stream 210 with data packets 212 is transmitted from the packet originator, through the first communication network 220A to a source security certificate engine 230A which is implemented on a first computerized device 232A, which may include any type of computerized device, including a local or network computer, a server, or another computing device. The first computerized device 232A is in communication with the first communication network 220A.

The source security certificate engine 230A includes various operations, modules, or functions, including, a learned route protocol 234, a certificate manager 236, and a packet authenticator 238. Other operations, modules, or functions may also be included. Generally speaking, the source security certificate engine 230A may perform the functions of encrypting data packets 212 within the data stream 210, authenticating the data packets 212, and determining a communication route for the data packet 212 to be transmitted over. The system 200 may create a certification authority per packet and follow a "DENY ANY Packet" first methodology. This methodology creates Zero Trust factor within the network creating essentially a "Trust Nothing & Verify and accept" based on the rule functions within system 200. System 200 has flexibility in operating. For example, the security models can be pre-programmed or with an AI interference learning activated based on ML models or combination of both, any combination of which can be used to verify packet level security and routing. Each data packet 212 generated by the engine 230A may assign a certificate signature and route the data packet 212 to one of the network channels, where an authenticator app assigns network route number and routes the packet to one of the network channels.

In more details, the packet authenticator 238 may authenticate the data packet 212, such as by performing an authentication function to determine, verify, or otherwise confirm an authenticity of the data packet 212. The certificate manager 236 may assign a certificate signature to the data packet 212 of the data stream 210 on a per-packet level, such that each data packet 212 is encrypted and includes its own certificate signature. Unlike conventional data security which assigns certificate signatures to a stream or file of data, the certificate signature is applied on a per-packet basis. For a system 200 which utilizes TM channels 130 in addition to an original carrier 110, as part of the plurality of carrier channels 240, as depicted in FIG. 3, the certificate manager 236 may be a TM certificate manager 236 which also manages TM certificates applied to the data packets 212.

The learned route protocol 234 may be an artificial intelligence (AI) enabled protocol which utilizes artificial intelligence processing techniques to select a carrier network path 130, 110, from one or more of a plurality of carrier network paths 240, on which or over which the data packet 212 can be transmitted or communicated. For example, per packet traffic flow may be assigned using AI based learned route to the TM channel, where AI route inference is run on a processor to code & decode the data packet 212. Since the data is transmitted on a data packet 212 level, it allows for various data packets 212 which form all or part of the data stream to be transmitted on different carrier network paths 110, 130, such that some data packets 212 can be transmitted over traditional carrier network paths 110 whereas others can be transmitted over other carrier network paths, such as TM channels 130. This ability to separately communicate encrypted data packets 212 may provide for very secure routing through data distribution since data on the packet level, where each individual packet that constitutes data, can be routed on one or more multiple paths such that even unauthorized access of some data packets 212 will not jeopardize the entirety of the data stream. This methodology exceeds the security requirements of the Department of Defense (DOD).

In greater detail, the learned route protocol 234 may select the selected carrier network path 110, 130 based on a selected security level for the data packet 212, whereby the security level may be selected by a user, selected by the system 200, or otherwise manually or automatically selected or determined. For instance, in one example, the security level may be selected based on a scale, such as a numerical scale (1-10) or another method, such that data packets 212 which have a higher need for secure transmission can be assigned a higher security level, whereas data packets 212 with a lower need for secure transmission may be assigned a lower security level.

The security level for data packets 212 may be used by the learned route protocol 234 to determine the selected network carrier path through one or more of the plurality of channels 240. For instance, data packets 212 with a higher security level may be transmitted over more secure paths, such as TM channels, whereas data packets 212 with a lower need for security may be transmitted over conventional networks, which are less secure than TM channels. The selected carrier network path, selected based on the selected security level for the data packet, may utilize the selected security level for the data packet to influence, control, or otherwise affect a randomness level of the selected carrier network path and channel conditions of the available carrier channels. In one example, a randomness level of the selected carrier network path is based on at least one of: data confidentiality of the data packet 212, source authentication of the data packet 212, source destination random code of the data packet 212. A higher security level of the data packet 212 may have a propensity for transmitting the data packet 212 through a more secure channel, simply due to the need for heighted transmission security. The randomness of the selected route may be a basis of operation of the learned route protocol 234, whereby once the security level of the packet 212 is determined or known, and any other conditions are considered, as needed, the learned route protocol 234 may assign the route based on randomness, such that there is less predictability of the transmission route. The randomness may rely on one or more random number generators or similar features.

Additionally, the learned route protocol 234 may assess channel conditions of the available channels to route data packets 212. For example, if a particular channel has an undesirable bandwidth limitation, or an undesirable signal to noise ratio, or another undesirable characteristic, the learned route protocol 234 may assess this negative condition and use it to adjust the selected route. For example, the learned route protocol 234 engine may assign a correlated level of security that is selected, where the level of randomness is assigned based on the learned route protocol 234 and level of security. Randomness may be correlated between transmitter and receiver based on the learned route protocol 234. Carrier channel conditions can change, so the learned route protocol 234 may continually or periodically monitor the channel conditions. The security level selected may influence the randomness, as well as take into account the specific carrier channel conditions, such that the routing of the data packet 212 is achieved in a manner which correlates to achieve a selected security level and is also based on channel conditions.

It is noted that the use of randomness for selecting the communication path may be advantageous to operation of the system 200 from a bandwidth perspective, since the ability to randomly transmit data packets 212 with the system 200 can help ensure secure transmission while not adding overhead data to existing data packets. Additionally, use of the system 200 does not disrupt standard communication protocols, such as those provided by IEEE or 3GPP.

When the selected carrier path is a TM channel, the TM signal is communicated on the TM channel, and the TM channel with TM signal does not exceed a spectral mask of an original carrier of an RF channel, as described relative to FIGS. 1-2. The encrypted data packet 212 may be carried within the TM signal to a destination security certificate engine 230B which is implemented on a second computerized device 232B, where the second computerized device 232B is in communication with the selected carrier network path 110, 130 of the plurality of channels 240, and a second communication network 220B. The destination security certificate engine 230B may receive the TM signal and decrypt the encrypted data packet 212 using the encryption key. Data packet 212 signature analysis may be done at the receiver decoder and may reassemble the data message with data packets from multiple TM networks. In addition to the use of a TM channel, other security protocols such as NIST 800-207 ZTA can be implemented as well.

The system 200 can be used to provide secure communications which meets or exceeds the security required by various industries or organizations, such as, for example, the strict privacy requirements of electronic healthcare records, security requirements of the financial industry, or security requirements of the Department of Defense (DOD). For the DOD specifically, the system 100 can achieve covert level security such as zero trust architecture (ZTA), where secure communication is achieved using TM on detection (TMOD), which enables DOD level security to mobile networks. The system 200 may have applicable use in various other industries, including with secure networks, financial networks, healthcare data, or other similar areas.

Figure 4:
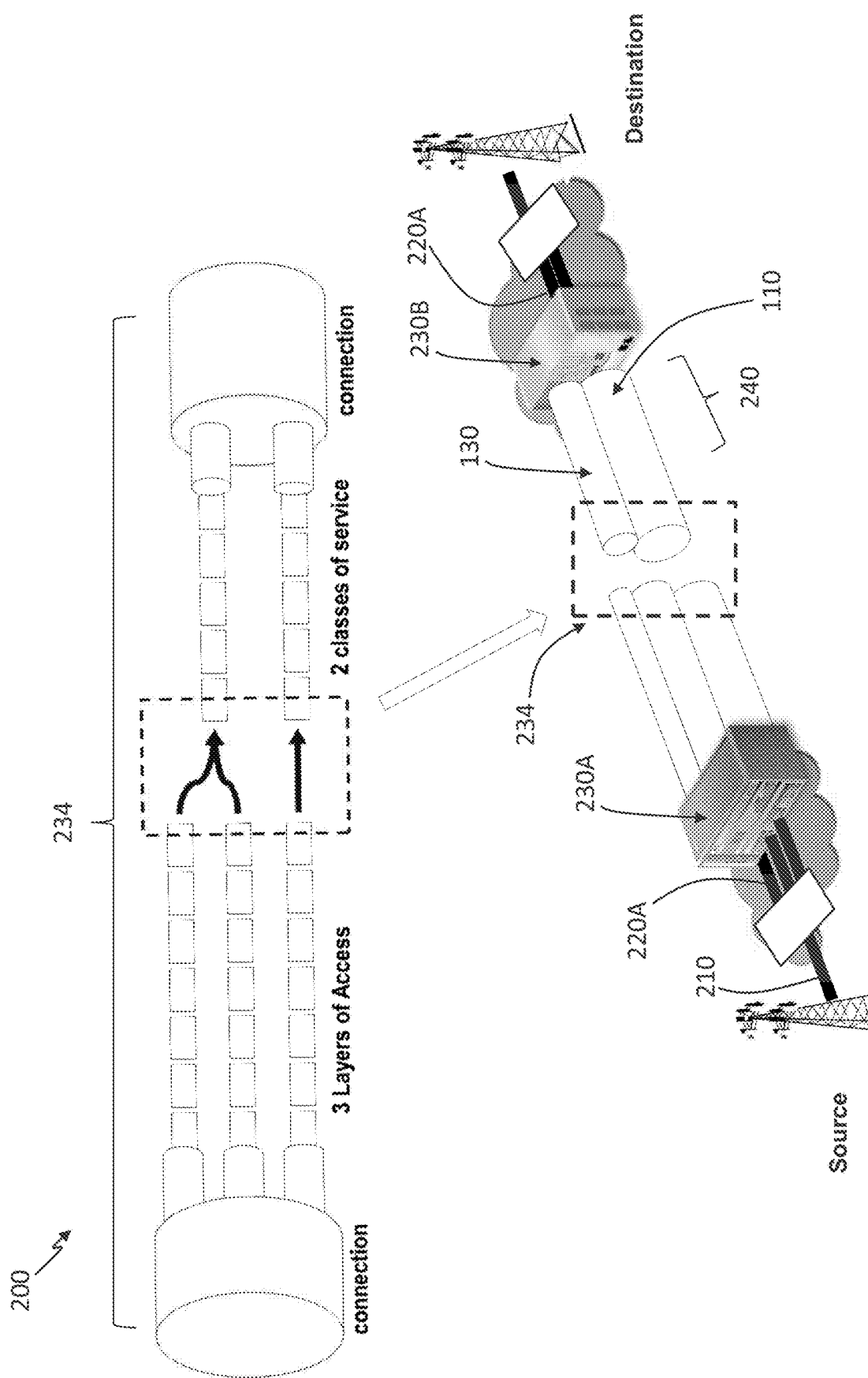
FIG. 4 is a diagrammatical illustration of a system for secure routing of data packets which uses transpositional modulation fortified communication, in accordance with embodiments of the present disclosure.

FIG. 4 is a diagrammatical illustration of a system for secure routing of data packets 200 which uses transpositional modulation fortified communication, in accordance with embodiments of the present disclosure. With reference to FIGS. 3-4, FIG. 4 illustrates an example of TM secure data routing using an AI-enabled learned route protocol 234 of a data packet. The learned route protocol 234 may use lightweight algorithms that securely route the packet-level traffic and counteract routing attacks that disrupt security vulnerability.

Function of FIG. 234 is as described in the Page 18. FIG. 234 provides processing for both Control and Data plane. FIG. 234 consists of Input & Output. Input consists building blocks of Policy Engine, Policy Administrator, Policy Enforcement. Policy Enforcement engine block will determine the nature of the packet—Untrusted vs Trusted and routes the packet if YES to 240. Drops/blocks the packet if NO. FIG. 234 also aided by external policy engines such as Data Access policy, Authentication policy, ID management etc., [[INVENTOR NOTE: please describe the algorithm in greater detail]]. With a TM channel 130 as part of the possible channels 240, namely as a secondary channel route to a carrier channel 110, the algorithm of the learned route protocol 234 finds the suitable path from the source originator, assigns a packet level routing label, and selects a random path out of available channel routes. The random path may be selected based on the variables as follows: data confidentiality, source authentication, and/or source destination random code.

The learned route protocol 234 may operate in two primary stages: a setup phase and an operational phase. During the setup phase, two different encryption keys may be added to the data packet 212, where the encryption keys are generated by the learned route protocol 234 sequence generator & authenticator with a packet level message code (Txr). The learned route protocol 234 may generate a secret handshake code (Tsh) that will be shared at the source and the destination. This code generally is a broadcast and advertised across the route channels, both TM and main channels. Additionally, a random TM secure routing key may be generated by the authenticator algorithm at both source and destination to code & decode the data packet 212.

Figure 5:
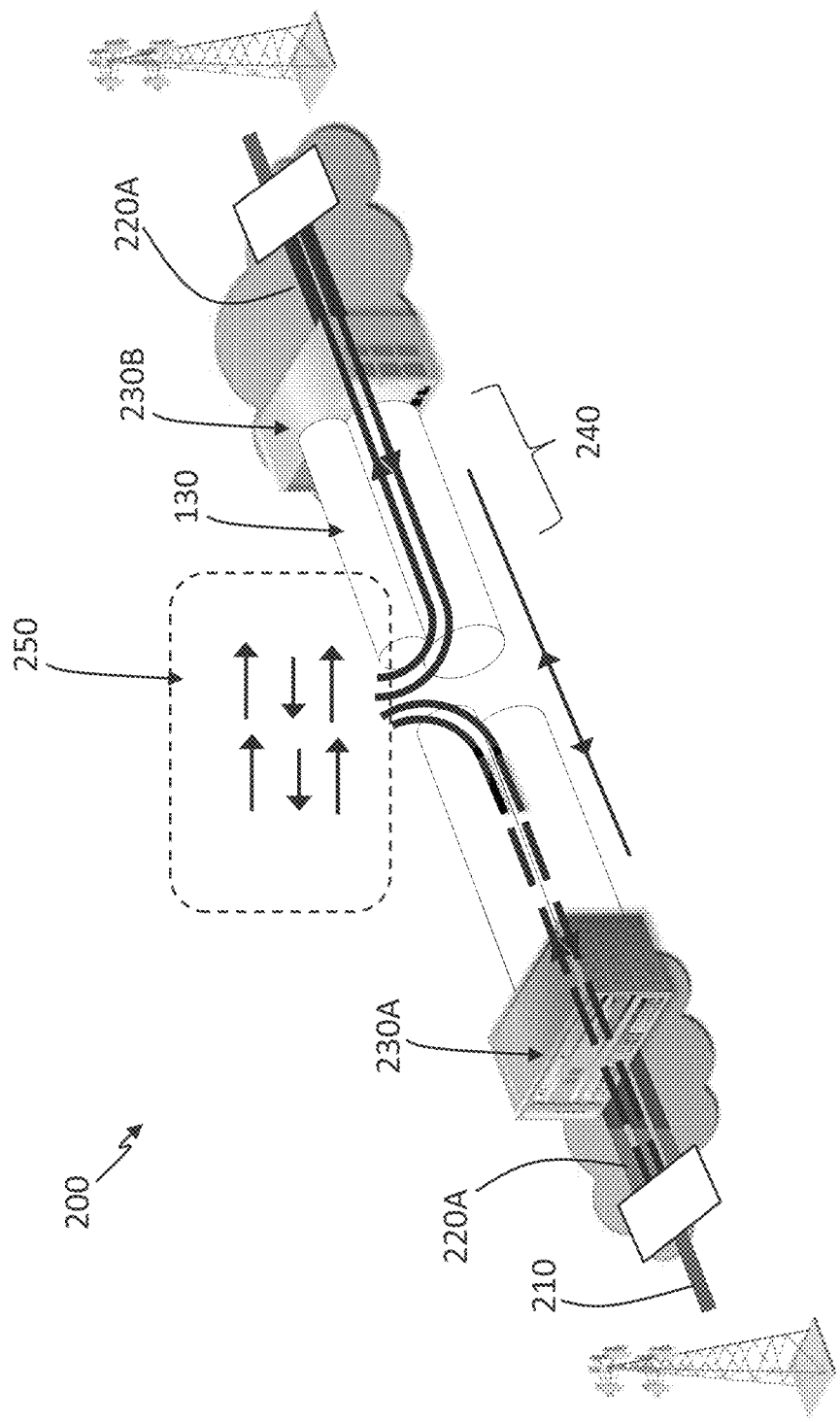
FIG. 5 is a diagrammatical illustration of a system for secure routing of data packets which uses transpositional modulation fortified communication, in accordance with embodiments of the present disclosure.

FIG. 5 is a diagrammatical illustration of a system for secure routing of data packets 200 which uses transpositional modulation fortified communication, in accordance with embodiments of the present disclosure. With reference to FIGS. 3-5, FIG. 5 illustrates an example of a TM engine 250 which is operated on the learned route protocol 234, the Tm certificate manager 236, and/or the packet authenticator 238. The TM engine 250 may provide functionality for handling the packet level authentication at the source and decoding the encrypted data packet 212 at the destination. Logical layers that each packet 212 transmits with TM engine 250 markings may include: TM as the main reference signal marking for the session, a PHY Layer for both uplink & downlink packets 212 with specific functions, such as Broadcast, Control and data are marked with appropriate Tm-b, Tm-c, Tm-d respectively, a PHY layer may be provided for mapping to subsequent layers such as MAC and RRC, as per 3GPP or respective technology standards. TM will map into PHY layer and seamlessly flows through subsequent higher layers. Additionally, a RRC layer (radio resource control layer) may be provided.

Figure 6:
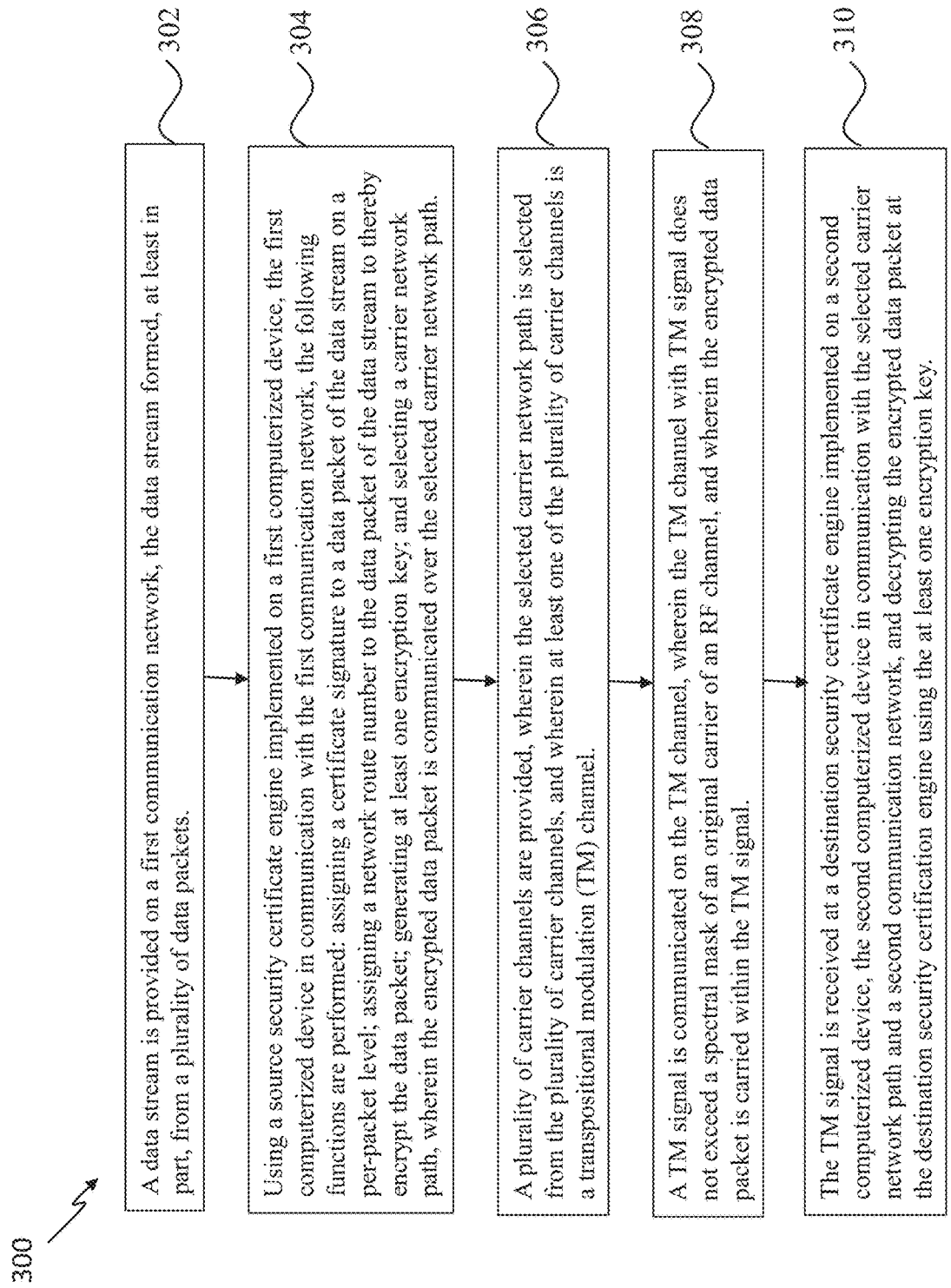
FIG. 6 is a flowchart illustrating a method of secure routing of data packets which uses transpositional modulation fortified communication, in accordance with embodiments of the present disclosure.

FIG. 6 is a flowchart 300 illustrating a method of secure routing of data packets which uses transpositional modulation fortified communication, in accordance with embodiments of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 302, a data stream is provided on a first communication network, the data stream formed, at least in part, from a plurality of data packets. Using a source security certificate engine implemented on a first computerized device, the first computerized device in communication with the first communication network, the following functions are performed: assigning a certificate signature to a data packet of the data stream on a per-packet level; assigning a network route number to the data packet of the data stream to thereby encrypt the data packet; generating at least one encryption key; and selecting a carrier network path, wherein the encrypted data packet is communicated over the selected carrier network path (block 304). A plurality of carrier channels are provided, wherein the selected carrier network path is selected from the plurality of carrier channels, and wherein at least one of the plurality of carrier channels is a transpositional modulation (TM) channel (block 306). A TM signal is communicated on the TM channel, wherein the TM channel with TM signal does not exceed a spectral mask of an original carrier of an RF channel, and wherein the encrypted data packet is carried within the TM signal (block 308). The TM signal is received at a destination security certificate engine implemented on a second computerized device, the second computerized device in communication with the selected carrier network path and a second communication network, and decrypting the encrypted data packet at the destination security certification engine using the at least one encryption key (block 310). Any number of additional steps, functions, processes, or variants thereof may be included in the method, including any disclosed relative to any other figure of this disclosure.

Figure 7:
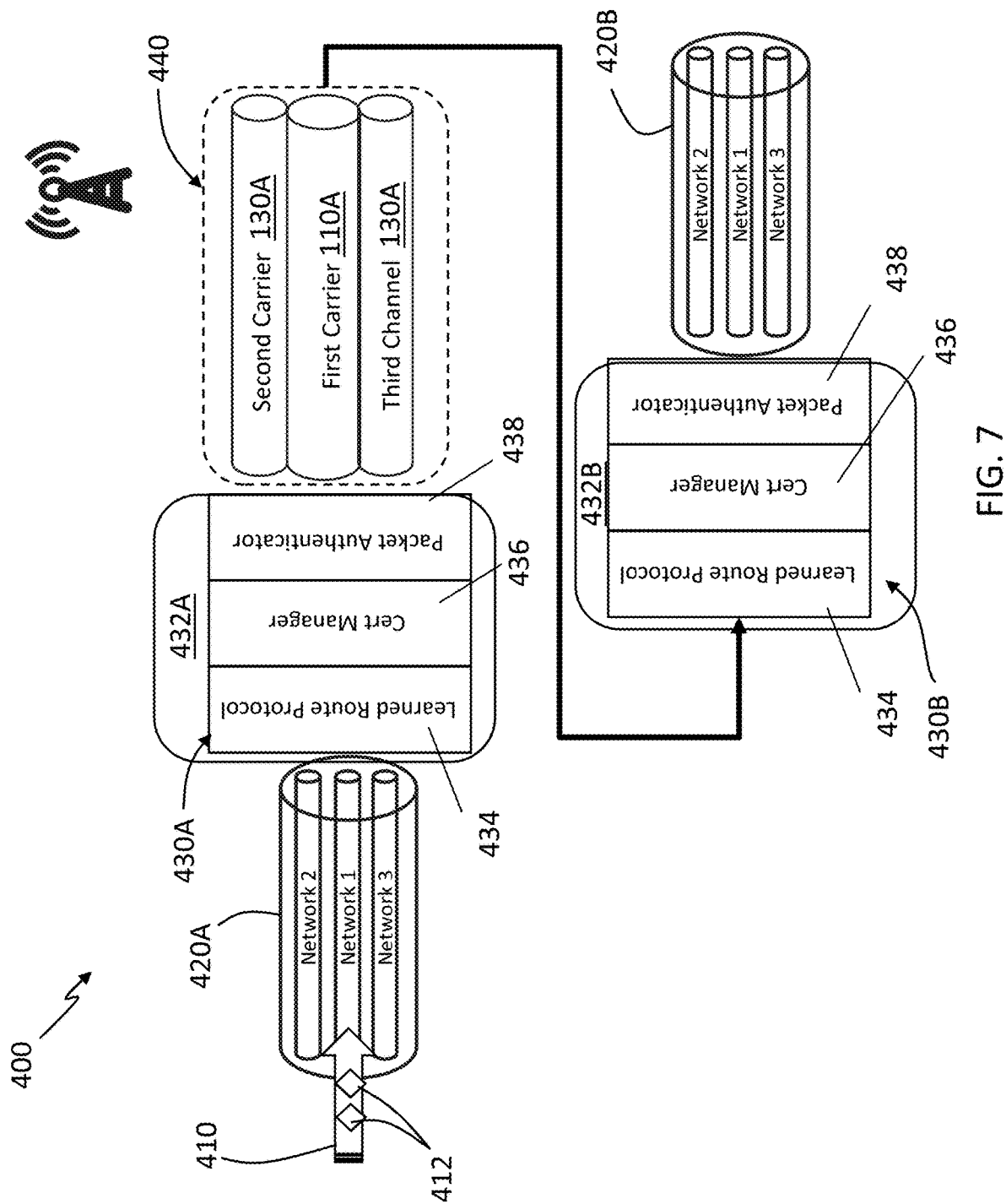
FIG. 7 is a diagrammatical illustration of a system for secure routing of data packets, in accordance with embodiments of the present disclosure.

FIG. 7 is a diagrammatical illustration of a system for secure routing of data packets 400, in accordance with embodiments of the present disclosure. The system for secure routing of data packets 400, which may be referred to herein as 'system 400' may be similar to the system 200 of FIGS. 3-5 with the exception that instead of using a TM channel, the data packets 412 are transmitted over non-TM networks. As shown in FIG. 7, the system 400 includes a data stream 410 provided, communicated, or transmitted on a first communication network 420A. The data stream 410 may be originated at any switch, router, or computing platform that originates data packets 412 within the data stream 410. In the Example depicted in FIG. 7, where TM techniques are not employed, network 1 may be the original network, whereas network 2 and network 3 may be other networks.

The first communication network 420A may include various networks, in terms of type and number, including, for example, wired or wireless networks, Personal Area Networks (PAN), Local Area Networks (LAN), Wide Area Networks (WAN), Wireless Local Area Networks (WLAN), the Internet, a cloud network, or any other type of network. The data stream 410 may include any type of electronic or computerized data, such as a data file or a portion thereof, of any type, medium, or file structure.

The data stream 410 is formed, at least in part, from a plurality of data packets 412 which is a formatted unit of data capable of being carried by a packet-switched network, where the data packet 412 commonly includes control information, such as a header and trailer, and user data, which is commonly referred to as the payload. The control information may provide data for delivering the payload, such as, for instance, the source and destination network addresses, error detection codes, or sequencing information, or others.

The data stream 410 with data packets 412 is transmitted from the packet originator, through the first communication network 420A to a source security certificate engine 430A which is implemented on a first computerized device 432A, which may include any type of computerized device, including a local or network computer, a server, or another computing device. The first computerized device 432A is in communication with the first communication network 420A.

The source security certificate engine 430A includes various operations, modules, or functions, including, a learned route protocol 434, a certificate manager 436, and a packet authenticator 438. Other operations, modules, or functions may also be included. Generally speaking, the source security certificate engine 430A may perform the functions of encrypting data packets 412 within the data stream 410, authenticating the data packets 412, and determining a communication route for the data packet 412 to be transmitted over. The system 400 may create a certification authority per packet and follow a "DENY ANY Packet" first methodology. This methodology creates Zero Trust factor within the network creating essentially a "Trust Nothing & Verify and accept" based on the rule functions within system 400. System 400 has flexibility in operating. For example, the security models can be pre-programmed or with an AI interference learning activated based on ML models or combination of both, any combination of which can be used to verify packet level security and routing. Each data packet 412 generated by the engine 430A may assign a certificate signature and route the data packet 412 to one of the network channels, where an authenticator app assigns network route number and routes the packet to one of the network channels.

In more details, the packet authenticator 438 may authenticate the data packet 412, such as by performing an authentication function to determine, verify, or otherwise confirm an authenticity of the data packet 412. The certificate manager 436 may assign a certificate signature to the data packet 412 of the data stream 410 on a per-packet level, such that each data packet 412 is encrypted and includes its own certificate signature. Unlike conventional data security which assigns certificate signatures to a stream or file of data, the certificate signature is applied on a per-packet basis.

The learned route protocol 434 may be an artificial intelligence (AI) enabled protocol which utilizes artificial intelligence processing techniques to select a carrier network path 130A, 110A, from one or more of a plurality of carrier network paths 440, on which or over which the data packet 412 can be transmitted or communicated. For example, per packet traffic flow may be assigned using AI based learned route on particular channel or carrier, where AI route inference is run on a processor to code & decode the data packet 412. Since the data is transmitted on a data packet 412 level, it allows for various data packets 412 which form all or part of the data stream to be transmitted on different carrier network paths 110A, 130A, such that some data packets 412 can be transmitted over traditional carrier network paths 110A whereas others can be transmitted over other carrier network paths 130A. This ability to separately communicate encrypted data packets 412 may provide for very secure routing through data distribution since data on the packet level, where each individual packet that constitutes data, can be routed on one or more multiple paths such that even unauthorized access of some data packets 412 will not jeopardize the entirety of the data stream. This methodology exceeds the security requirements of the Department of Defense (DOD).

In greater detail, the learned route protocol 434 may select the selected carrier network path 110A, 130A based on a selected security level for the data packet 412, whereby the security level may be selected by a user, selected by the system 400, or otherwise manually or automatically selected or determined. For instance, in one example, the security level may be selected based on a scale, such as a numerical scale (1-10) or another method, such that data packets 412 which have a higher need for secure transmission can be assigned a higher security level, whereas data packets 412 with a lower need for secure transmission may be assigned a lower security level.

The security level for data packets 412 may be used by the learned route protocol 434 to determine the selected network carrier path through one or more of the plurality of channels 440. For instance, data packets 412 with a higher security level may be transmitted over more secure paths, such as private channels, whereas data packets 412 with a lower need for security may be transmitted over conventional public networks, which are less secure than private channels. The selected carrier network path, selected based on the selected security level for the data packet, may utilize the selected security level for the data packet to influence, control, or otherwise affect a randomness level of the selected carrier network path and channel conditions of the available carrier channels. In one example, a randomness level of the selected carrier network path is based on at least one of: data confidentiality of the data packet 412, source authentication of the data packet 412, source destination random code of the data packet 412. A higher security level of the data packet 412 may have a propensity for transmitting the data packet 412 through a more secure channel, simply due to the need for heighted transmission security. The randomness of the selected route may be a basis of operation of the learned route protocol 434, whereby once the security level of the packet 412 is determined or known, and any other conditions are considered, as needed, the learned route protocol 434 may assign the route based on randomness, such that there is less predictability of the transmission route. The randomness may rely on one or more random number generators or similar features.

Additionally, the learned route protocol 434 may assess channel conditions of the available channels to route data packets 412. For example, if a particular channel has an undesirable bandwidth limitation, or an undesirable signal to noise ratio, or another undesirable characteristic, the learned route protocol 434 may assess this negative condition and use it to adjust the selected route. For example, the learned route protocol 434 engine may assign a correlated level of security that is selected, where the level of randomness is assigned based on the learned route protocol 434 and level of security. Randomness may be correlated between transmitter and receiver based on the learned route protocol 434. Carrier channel conditions can change, so the learned route protocol 434 may continually or periodically monitor the channel conditions. The security level selected may influence the randomness, as well as consider the specific carrier channel conditions, such that the routing of the data packet 412 is achieved in a manner which correlates to achieve a selected security level and is also based on channel conditions.

It is noted that the use of randomness for selecting the communication path may be advantageous to operation of the system 400 from a bandwidth perspective, since the ability to randomly transmit data packets 412 with the system 400 can help ensure secure transmission while not adding overhead data to existing data packets. Additionally, use of the system 400 does not disrupt standard communication protocols, such as those provided by IEEE or 3GPP.

Once the encrypted data packet 412 is received at the destination, it may be received at a destination security certificate engine 430B which is implemented on a second computerized device 432B, where the second computerized device 432B is in communication with the selected carrier network path 110, 130 of the plurality of channels 440, and a second communication network 420B. The destination security certificate engine 430B may receive the signal with encrypted data packet 412 and decrypt the encrypted data packet 412 using the encryption key.

The system 400 can be used to provide secure communications which meets or exceeds the security required by various industries or organizations, such as, for example, the strict privacy requirements of electronic healthcare records, security requirements of the financial industry, or security requirements of the Department of Defense (DOD). The system 400 may have applicable use in various other industries, including with secure networks, financial networks, healthcare data, or other similar areas.

Figure 8:
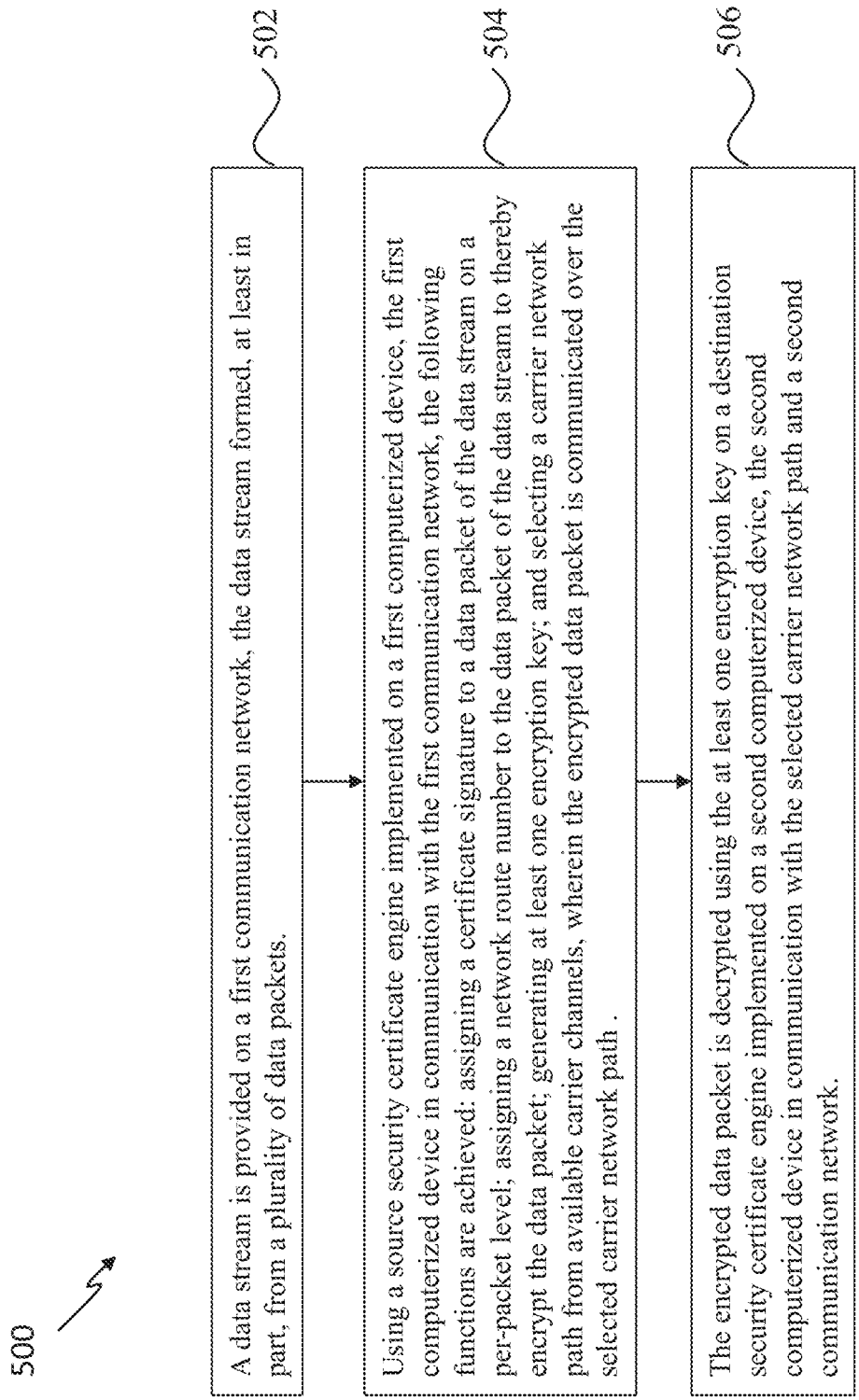
FIG. 8 is a flowchart illustrating a method of secure routing of data packets, in accordance with embodiments of the present disclosure.

FIG. 8 is a flowchart 500 illustrating a method of secure routing of data packets, in accordance with embodiments of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 502, a data stream is provided on a first communication network, the data stream formed, at least in part, from a plurality of data packets. Using a source security certificate engine implemented on a first computerized device, the first computerized device in communication with the first communication network, the following functions are achieved: assigning a certificate signature to a data packet of the data stream on a per-packet level; assigning a network route number to the data packet of the data stream to thereby encrypt the data packet; generating at least one encryption key; and selecting a carrier network path from available carrier channels, wherein the encrypted data packet is communicated over the selected carrier network path (block 504). The encrypted data packet is decrypted using the at least one encryption key on a destination security certificate engine implemented on a second computerized device, the second computerized device in communication with the selected carrier network path and a second communication network (block 506). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for secure routing of data packets, the system comprising:
    a data stream on a first communication network, the data stream formed, at least in part, from a plurality of data packets;
    a source security certificate engine implemented on a first computerized device, the first computerized device in communication with the first communication network, wherein the source security certificate engine:
        assigns a certificate signature to a data packet of the data stream on a per-packet level;
        assigns a network route number to the data packet of the data stream to thereby encrypt the data packet;
        generates at least one encryption key; and
        selects a carrier network path from available carrier channels, wherein the encrypted data packet is communicated over the selected carrier network path; and
    a destination security certificate engine implemented on a second computerized device, the second computerized device in communication with the selected carrier network path and a second communication network, wherein the destination security certificate engine decrypts the encrypted data packet using the at least one encryption key.

2. The system of claim 1, wherein the source security certificate engine further comprises:
    a packet authenticator that authenticates the data packet;
    a certificate manager that assigns the certificate signature to the data packet; and
    a learned route protocol utilizing artificial intelligence processing techniques to select the selected carrier network path.

3. The system of claim 2, wherein the learned route protocol selects the selected carrier network path based on a selected security level for the data packet.

4. The system of claim 3, whereby the selected carrier network path is selected based on the selected security level for the data packet, wherein the selected security level for the data packet influences a randomness level of the selected carrier network path and channel conditions of the available carrier channels.

5. The system of claim 4, wherein a randomness level of the selected carrier network path is based on at least one of: data confidentiality of the data packet, source authentication of the data packet, source destination random code of the data packet.

6. A method for secure routing of data packets, the method comprising:
    providing a data stream on a first communication network, the data stream formed, at least in part, from a plurality of data packets;
    using a source security certificate engine implemented on a first computerized device, the first computerized device in communication with the first communication network:
        assigning a certificate signature to a data packet of the data stream on a per-packet level;
        assigning a network route number to the data packet of the data stream to thereby encrypt the data packet;
        generating at least one encryption key; and
        selecting a carrier network path from available carrier channels, wherein the encrypted data packet is communicated over the selected carrier network path; and
    decrypting the encrypted data packet using the at least one encryption key on a destination security certificate engine implemented on a second computerized device, the second computerized device in communication with the selected carrier network path and a second communication network.

7. The method of claim 6, wherein the source security certificate engine further comprises:
- a packet authenticator that authenticates the data packet;
- a certificate manager that assigns the certificate signature to the data packet; and
- a learned route protocol utilizing artificial intelligence processing techniques to select the selected carrier network path.

8. The method of claim 7, further comprising selecting, by the learned route protocol, the selected carrier network path based on a selected security level for the data packet.

9. The method of claim 8, whereby the selected carrier network path is selected based on the selected security level for the data packet, wherein the selected security level for the data packet influences a randomness level of the selected carrier network path and channel conditions of the available carrier channels.

10. The method of claim 9, wherein a randomness level of the selected carrier network path is based on at least one of: data confidentiality of the data packet, source authentication of the data packet, source destination random code of the data packet.

11. A system for secure routing of data packets, the system comprising:
- a data stream on a first communication network, the data stream formed, at least in part, from a plurality of data packets;
- a source security certificate engine implemented on a first computerized device, the first computerized device in communication with the first communication network, wherein the source security certificate engine:
  - assigns a certificate signature to a data packet of the data stream on a per-packet level;
  - assigns a network route number to the data packet of the data stream to thereby encrypt the data packet;
  - generates at least one encryption key; and
  - selects a carrier network path, wherein the encrypted data packet is communicated over the selected carrier network path;
- a plurality of carrier channels, wherein the selected carrier network path is selected from the plurality of carrier channels, and wherein at least one of the plurality of carrier channels is a transpositional modulation (TM) channel;
- a TM signal communicated on the TM channel, wherein the TM channel with TM signal does not exceed a spectral mask of an original carrier of an RF channel, and wherein the encrypted data packet is carried within the TM signal; and
- a destination security certificate engine implemented on a second computerized device, the second computerized device in communication with the selected carrier network path and a second communication network, wherein the destination security certificate engine receives the TM signal and decrypts the encrypted data packet using the at least one encryption key.

12. The system of claim 11, wherein the source security certificate engine further comprises:
- a packet authenticator that authenticates the data packet;
- a TM certificate manager that assigns the certificate signature to the data packet; and
- a learned route protocol utilizing artificial intelligence processing techniques to select the selected carrier network path.

13. The system of claim 12, wherein the learned route protocol selects the selected carrier network path based on a selected security level for the data packet.

14. The system of claim 13, whereby the selected carrier network path is selected based on the selected security level for the data packet, wherein the selected security level for the data packet influences a randomness level of the selected carrier network path and channel conditions of the available carrier channels.

15. The system of claim 14, wherein a randomness level of the selected carrier network path is based on at least one of: data confidentiality of the data packet, source authentication of the data packet, source destination random code of the data packet.

16. A method for secure routing of data packets, the method comprising:
- providing a data stream on a first communication network, the data stream formed, at least in part, from a plurality of data packets;
- using a source security certificate engine implemented on a first computerized device, the first computerized device in communication with the first communication network:
  - assigning a certificate signature to a data packet of the data stream on a per-packet level;
  - assigning a network route number to the data packet of the data stream to thereby encrypt the data packet;
  - generating at least one encryption key; and
  - selecting a carrier network path, wherein the encrypted data packet is communicated over the selected carrier network path;
- providing a plurality of carrier channels, wherein the selected carrier network path is selected from the plurality of carrier channels, and wherein at least one of the plurality of carrier channels is a transpositional modulation (TM) channel;
- communicating a TM signal on the TM channel, wherein the TM channel with TM signal does not exceed a spectral mask of an original carrier of an RF channel, and wherein the encrypted data packet is carried within the TM signal; and
- receiving the TM signal at a destination security certificate engine implemented on a second computerized device, the second computerized device in communication with the selected carrier network path and a second communication network, and decrypting the encrypted data packet at the destination security certification engine using the at least one encryption key.

17. The method of claim 16, wherein the source security certificate engine further comprises:
- a packet authenticator that authenticates the data packet;
- a TM certificate manager that assigns the certificate signature to the data packet; and
- a learned route protocol utilizing artificial intelligence processing techniques to select the selected carrier network path.

18. The method of claim 17, further comprising selecting, by the learned route protocol, the selected carrier network path based on a selected security level for the data packet.

19. The method of claim 18, whereby the selected carrier network path is selected based on the selected security level for the data packet, wherein the selected security level for the data packet influences a randomness level of the selected carrier network path and channel conditions of the available carrier channels.

20. The method of claim 19, wherein a randomness level of the selected carrier network path is based on at least one of: data confidentiality of the data packet, source authentication of the data packet, source destination random code of the data packet.

\* \* \* \* \*